UNITED STATES PATENT OFFICE 2,190,769

WASHING AND CLEANSING AGENT AND PROCESS OF MAKING SAME

Karl Butz, Chemnitz, Germany, assignor, by mesne assignments, to American Hyalsol Corporation, Wilmington, Del., a corporation of Delaware No Drawing. Application June 27, 1934, Serial No. 732,734. In Germany June 30, 1933

3 Claims. (Cl. 87—5)

This invention relates to the production of washing and cleansing agents and to the agents themselves. More particularly it relates to pyrophosphoric acid derivatives of higher molecular hydroxy compounds and their water soluble salts, which I have discovered possess unique detergent powers.

These washing and cleansing agents are produced in accordance with the present invention by reacting pyrophosphoric acid compounds with certain higher molecular compounds, preferably alcohols, and neutralizing the reaction products with alkalis or other bases to form water-soluble salts. To cause the initial reaction to proceed satisfactorily a heating is necessary, and is preferably accomplished by heating one or both of the materials before mixing. The particular temperature employed depends, of course, upon the properties of the higher molecular alcohol (or alcohol mixture) or equivalent substance selected and also upon the pyrophosphating agent employed. For a given combination of raw materials the most effective temperature must be determined by experimentation. If too low a temperature is used insufficient or no reaction occurs, and if too high a temperature is employed, decomposition occurs or objectionable secondary reactions result. In general, temperatures between about 85 and 115° C. are most satisfactory. Inasmuch as the reaction is exothermic in nature, an initial heating to say 90° C. automatically increases to about 110° C. in the apparatus I employ.

After neutralization the reaction products may be purified and dried in any suitable manner as by settling and decanting, extracting as with hot alcohol or ether, or by recrystallization.

The preferred higher molecular hydroxy compounds which I employ in the process of my invention are normal primary alcohols having from 12 to 18 carbon atoms in the chain produceable from natural fats and waxes as by catalytic hydrogenation, sodium and lower molecular alcohol reduction, or by saponification and distillation. In general the alcohols suitable are those having more than eight carbon atoms, but those of the lower number within this range are most effective if employed in admixture with alcohols of a higher number of atoms, which mixtures may be natural mixtures altered or not as by distillation, or they may be specially prepared mixtures added together before or after pyrophosphating and/or neutralization.

The alcohols which will produce the valuable cleaning and washing agents include lauryl, myristyl, stearyl, oleyl, ricinoleyl and linoleyl alcohols. These alcohols thus may be saturated or unsaturated, monohydroxy or polyhydroxy. Natural mixtures, altered or not, suitable as raw material include those obtained from cocoanut and palm nut oils or from sperm oil, which may be previously hardened by hydrogenation if so desired.

The exact chemical structure of the reaction product of the present invention has not been determined, but it is believed to be composed of salts of mixtures of the various pyrophosphate esters, and other converted and unconverted products. The specific methods of production hereinafter disclosed definitely result in products containing a proportion of the unreacted higher molecular alcohol. This alcohol is of considerable value to the washing agent in certain specific uses.

Example 1

According to a preferred procedure, 400 parts by weight of a mixture of alcohols obtained from cocoanut oil by catalytic hydrogenation, and 180 parts of pyrophosphoric acid are separately heated to about 90° C. after which they are mixed together in any suitable manner, that is, by pouring either one into the body of the other or by simultaneous introduction, during stirring or not.

The temperature of the mass commences to rise and may reach about 110° C. A violet brown syrupy reaction product is obtained. This mass preferably while or after cooling is neutralized by adding during stirring about 80 parts of sodium hydroxide dissolved in about 4 to 5 times its weight in water. As a result, a homogeneous pale yellow paste is obtained which is almost completely soluble in alcohol. This paste may be purified in any suitable manner as by recrystallization. Upon drying, sodium salts of higher molecular alkyl esters of pyrophosphoric acid are obtained, which product may contain as high as 64.3% of the unreacted alcohol.

Example 2

After being heated to about 90° C., 200 parts by weight of cocoanut fatty alcohol i. e. lauryl alcohol are introduced during constant agitation into 540 parts of pyrophosphoric acid which has previously been heated to about 95° C. The temperature rises to about 110° C. After the reaction mass has partially cooled off, it may be satisfactorily neutralized by stirring in 360 parts of sodium hydroxide in solution in 3 to 4 times as much water. Cooling of the reaction mass may be necessary to prevent decomposition of the phosphoric acid ester formed. Neutralization may alternatively be accomplished by simultaneously introducing the phosphate ester and sodium hydroxide solution into a body of water. The pyrophosphoric acid ester salt produced is then precipitated and the mass allowed to stand to form two layers, the top water layer then being decanted off. The lower layer is a pale yellow paste which may be purified by extracting several times with hot alcohol and treatment with ether. After being dried by any suitable method a product is obtained which contains about 24% unreacted higher molecular alcohol. It is readily soluble in water and possesses excellent detergent properties.

*Example 3*

In producing the washing agents from hardened sperm oil, 540 parts thereof are mixed with 180 parts of pyrophosphoric acid at a temperature initially at about 90° C. By working in a manner similar to that described in preceding examples, a product is obtained containing about 80% of unreacted alcohol, which product is soluble in heated ethyl alcohol.

*Example 4*

When 270 parts of hardened sperm oil heated to 90° C. are esterified with 540 parts of pyrophosphoric acid and neutralized, purified and dried, as above described, an ester salt is obtained containing about 25% unreacted alcohol.

The bases suitable for neutralizing the acid esters are broadly those which will produce water-soluble salts and may be either inorganic or organic. Of the inorganic bases there may be mentioned specially those of the alkali metals and of ammonia; of the organic bases, pyridine and its homologues, piperidine, aliphatic amines as triethanolamine. The neutralization may be accomplished in aqueous or with anhydrous bases in the absence of alcohol and water.

In some cases the reaction between the pyrophosphating agent and the higher molecular hydroxy compound may be aided by the addition of dehydrating media such as acid anhydrides as acetic anhydride or anhydrous organic acids or chlorides of lower molecular weight.

The products produced by the methods herein disclosed may be used alone as washing or cleaning agents or in admixture with soaps or with solid acids or acid salts to form soap substitutes, either with or without additional solvents, detergent salts, bleaching agents, as $H_2O_2$ and $Na_2O_2$; or they may be mixed with lanolin or other fatty agents to alter their properties. It is therefore seen that washing and cleaning agents of special properties to meet many different demands in domestic and industrial fields may be prepared in accordance with the present invention.

Though the higher molecular normal primary alcohol esters of pyrophosphoric acid have been found to possess the greatest washing and cleaning powers for most purposes, esters of value for general or special use may likewise be produced from unsaturated hydrocarbons, oxidized hydrocarbons and unsaturated or hydroxy ethers, the only essential being that these compounds contain an aliphatic chain of eight or more carbon atoms. The ether may be mixed and contain an alkyl radical of from one to five carbon atoms which may have a hydroxy radical or not.

The alkali salts of the pyrophosphoric acid esters of the higher molecular aliphatic alcohols of the present invention have been found by actual tests to possess a considerably better washing power than the corresponding alcohol esters of sulfuric acid which up to the present time have been considered the best known synthetic washing agents. In the tests performed, solutions of the pyrophosphoric acid esters and the sulfuric acid esters of the same concentration and pH value and at the same temperature were compared as to their detergent powers upon a standard contaminated cloth. The esters of pyrophosphoric acid likewise have shown superiority over the esters of orthophosphoric acid.

It should be understood that the present invention is not limited to the specific examples herein disclosed but that it includes all variations of materials and procedural steps within the tenor of the whole description and the claims appended hereto.

I claim:

1. The process of producing a washing and cleaning agent composed of a water soluble salt of a pyrophosphoric acid ester of a higher molecular alcohol having at least eight carbon atoms and a portion of the unreacted alcohol which comprises mixing pyrophosphoric acid and a higher molecular alcohol having at least eight carbon atoms at a temperature of from about 85 to 115° C., until maximum esterification has taken place and thereafter neutralizing to form a water soluble salt of the pyrophosphoric acid ester of the higher molecular alcohol treated.

2. A washing and cleaning agent comprising a water soluble salt of a pyrophosphoric acid ester of a higher molecular secondary hydroxy aliphatic hydrocarbon.

3. A washing and cleaning composition containing a water soluble salt of a pyrophosphoric acid ester of a higher molecular secondary hydroxy aliphatic hydrocarbon.

KARL BUTZ.